United States Patent
Rainville et al.

(10) Patent No.: US 11,414,199 B2
(45) Date of Patent: Aug. 16, 2022

(54) FUEL CELL POWERED LINE-REPLACEABLE THRUST MODULE

(71) Applicant: Bell Helicopter Textron Inc., Fort Worth, TX (US)

(72) Inventors: Joseph Dean Rainville, Fort Worth, TX (US); John Richard McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 556 days.

(21) Appl. No.: 16/290,704

(22) Filed: Mar. 1, 2019

(65) Prior Publication Data

US 2020/0277069 A1    Sep. 3, 2020

(51) Int. Cl.
| | | |
|---|---|---|
| *B64D 29/06* | (2006.01) | |
| *B64C 27/26* | (2006.01) | |
| *B64C 29/02* | (2006.01) | |
| *B64C 39/02* | (2006.01) | |
| *B60L 58/30* | (2019.01) | |
| *B64D 27/24* | (2006.01) | |

(52) U.S. Cl.
CPC .............. *B64D 29/06* (2013.01); *B60L 58/30* (2019.02); *B64C 27/26* (2013.01); *B64C 29/02* (2013.01); *B64C 39/024* (2013.01); *B64D 27/24* (2013.01); *B60L 2200/10* (2013.01); *B64C 2201/042* (2013.01); *B64C 2201/104* (2013.01); *B64C 2201/165* (2013.01)

(58) Field of Classification Search
CPC ........ B64C 2201/042; B64C 2201/108; B64C 2201/165; B64C 39/024; B64C 2201/021; B64C 2201/027; B64C 2201/104; B64C 27/26; B64C 29/02; B60L 2200/10; B60L 50/75; B60L 58/30; H01M 2250/20; H01M 8/04089; H01M 8/04201; Y02E 60/32; Y02E 60/50; Y02T 90/40; Y02T 10/70; Y02T 90/16
See application file for complete search history.

(56) References Cited

U.S. PATENT DOCUMENTS

| | | | | |
|---|---|---|---|---|
| 8,544,788 | B1 * | 10/2013 | Capper | B64B 1/28 244/33 |
| 9,815,554 | B2 * | 11/2017 | Plater | B64C 39/024 |
| 10,589,867 | B2 * | 3/2020 | Lukaczyk | B64C 29/0033 |
| 10,604,253 | B2 * | 3/2020 | Pilskalns | B64C 39/024 |
| 10,773,861 | B2 * | 9/2020 | Caswell | B65D 21/0223 |
| 2010/0187237 | A1 * | 7/2010 | Brooks | F17C 1/12 220/560.04 |

(Continued)

*Primary Examiner* — Medhat Badawi
(74) *Attorney, Agent, or Firm* — Lightfoot & Alford PLLC

(57) ABSTRACT

A line-replaceable thrust module includes a nacelle configured to be mechanically connected to an anchoring location of an unmanned aerial vehicle (UAV), an electric motor coupled to the nacelle, an electric speed controller configured to control the speed of the electric motor and configured to be electrically connected to a communication network of the UAV, and a fuel cell system configured to produce electrical energy from an electrochemical reaction between hydrogen and oxygen. The fuel cell system includes a fuel cell, a hydrogen tank, a pressure regulator coupled to the hydrogen tank, and a supply line coupled between the pressure regulator and the fuel cell.

18 Claims, 12 Drawing Sheets

(56) References Cited

U.S. PATENT DOCUMENTS

| | | | | |
|---|---|---|---|---|
| 2016/0006056 A1* | 1/2016 | Jeon | ............... | H01M 8/0432 |
| | | | | 429/429 |
| 2016/0036071 A1* | 2/2016 | Klewer | ............ | H01M 8/04723 |
| | | | | 244/53 R |
| 2018/0002011 A1* | 1/2018 | McCullough | ......... | B64C 39/024 |
| 2018/0002026 A1* | 1/2018 | Oldroyd | ................. | B64C 11/46 |
| 2018/0257761 A1* | 9/2018 | Oldroyd | ................ | B64D 31/06 |
| 2018/0265193 A1* | 9/2018 | Gibboney | ............... | B64C 39/08 |
| 2018/0290742 A1* | 10/2018 | Oldroyd | ................... | B64C 1/32 |
| 2018/0297712 A1* | 10/2018 | Oldroyd | ................. | B64C 29/02 |
| 2019/0031339 A1* | 1/2019 | McCullough | .......... | B64C 29/02 |
| 2019/0031361 A1* | 1/2019 | McCullough | .......... | B64C 11/46 |
| 2019/0243385 A1* | 8/2019 | Khoo | ..................... | B64C 27/20 |
| 2020/0031451 A1* | 1/2020 | Bar Hillel | ............... | F42B 10/12 |
| 2020/0091528 A1* | 3/2020 | Okawachi | ........ | H01M 8/04089 |
| 2020/0091530 A1* | 3/2020 | Yu | ..................... | H01M 8/04201 |
| 2020/0223545 A1* | 7/2020 | Brooks | ................. | B64D 27/24 |
| 2020/0239137 A1* | 7/2020 | Regev | ..................... | B64F 1/32 |
| 2020/0355117 A1* | 11/2020 | Miftakhov | ........ | H01M 8/04201 |

\* cited by examiner

FUEL CELL POWERED LINE-REPLACEABLE THRUST MODULE

BACKGROUND

Unmanned aerial vehicles ("UAVs"), or drones, are usually battery powered and are therefore limited in range by battery life. Hydrogen fuel cells are being considered as an option to extend range and flight time of UAVs. Fuel cells operate by allowing an electrochemical reaction between hydrogen and oxygen, which produces electrical energy and water. In most fuel cell powered vehicles, hydrogen fuel, stored in an onboard hydrogen fuel tank, is supplied to an anode of the fuel cell and ambient air is supplied to a cathode of the fuel cell. The electrical energy produced drives a motor and the water is disposed of. Fuel cells, along with the electronics they power, are complex devices that may be difficult to repair at an operating location.

UAVs come in many different configurations. For example, a UAV may be configured as a conventional takeoff and landing (CTOL) aircraft or a vertical takeoff and landing (VTOL) aircraft. A CTOL aircraft generates lift in response to the forward airspeed of the aircraft. The forward airspeed is typically generated by thrust from one or more propellers. Accordingly, CTOL aircraft typically require a long runway for takeoff and landing to accommodate the acceleration and deceleration required to provide the desired lift. Unlike CTOL aircraft, VTOL aircraft do not require runways. Instead, VTOL aircraft are capable of taking off, hovering and landing vertically. One example of VTOL aircraft is a helicopter which includes one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas where CTOL aircraft may be unable to take off and land. Helicopters, however, typically lack the forward airspeed and range of CTOL aircraft. Other examples of VTOL aircraft include tiltrotor aircraft and tiltwing aircraft. Both of which attempt to combine the benefits of a VTOL aircraft with the forward airspeed and range of a CTOL aircraft. Tiltrotor aircraft typically utilize a pair of nacelles rotatably coupled to a fixed wing. Each nacelle includes a proprotor extending therefrom, wherein the proprotor acts as a helicopter rotor when the nacelle is in a vertical position and a fixed-wing propeller when the nacelle is in a horizontal position. A tiltwing aircraft utilizes a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight.

Yet another example of a VTOL aircraft is a tailsitter aircraft. Tailsitter aircraft, such as those disclosed in U.S. patent application Ser. No. 16/154,326, filed Oct. 8, 2018 and U.S. patent application Ser. No. 15/606,242, filed May 26, 2017, both of which are incorporated herein by reference in their entireties, attempt to combine the benefits of a VTOL aircraft with the forward airspeed and range of a CTOL aircraft by rotating the entire aircraft from a vertical orientation for takeoff, landing, hovering, and low-speed horizontal movement, to a horizontal orientation for high speed and long-range flight.

DETAILED DESCRIPTION

Figure 1:
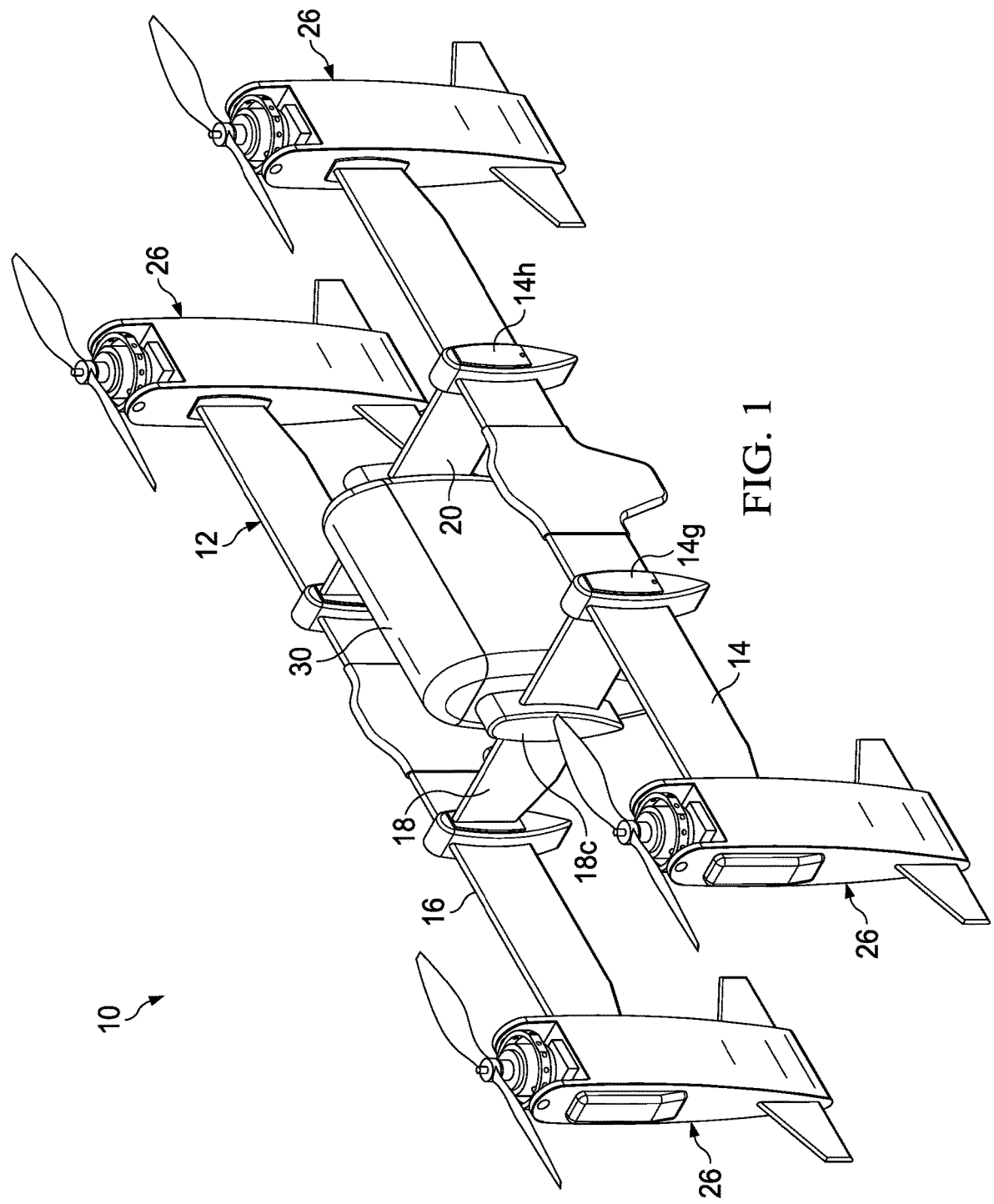
FIG. 1 is an oblique view of a UAV, including four fuel cell powered line-replaceable thrust modules, according to this disclosure.
Figure 2:
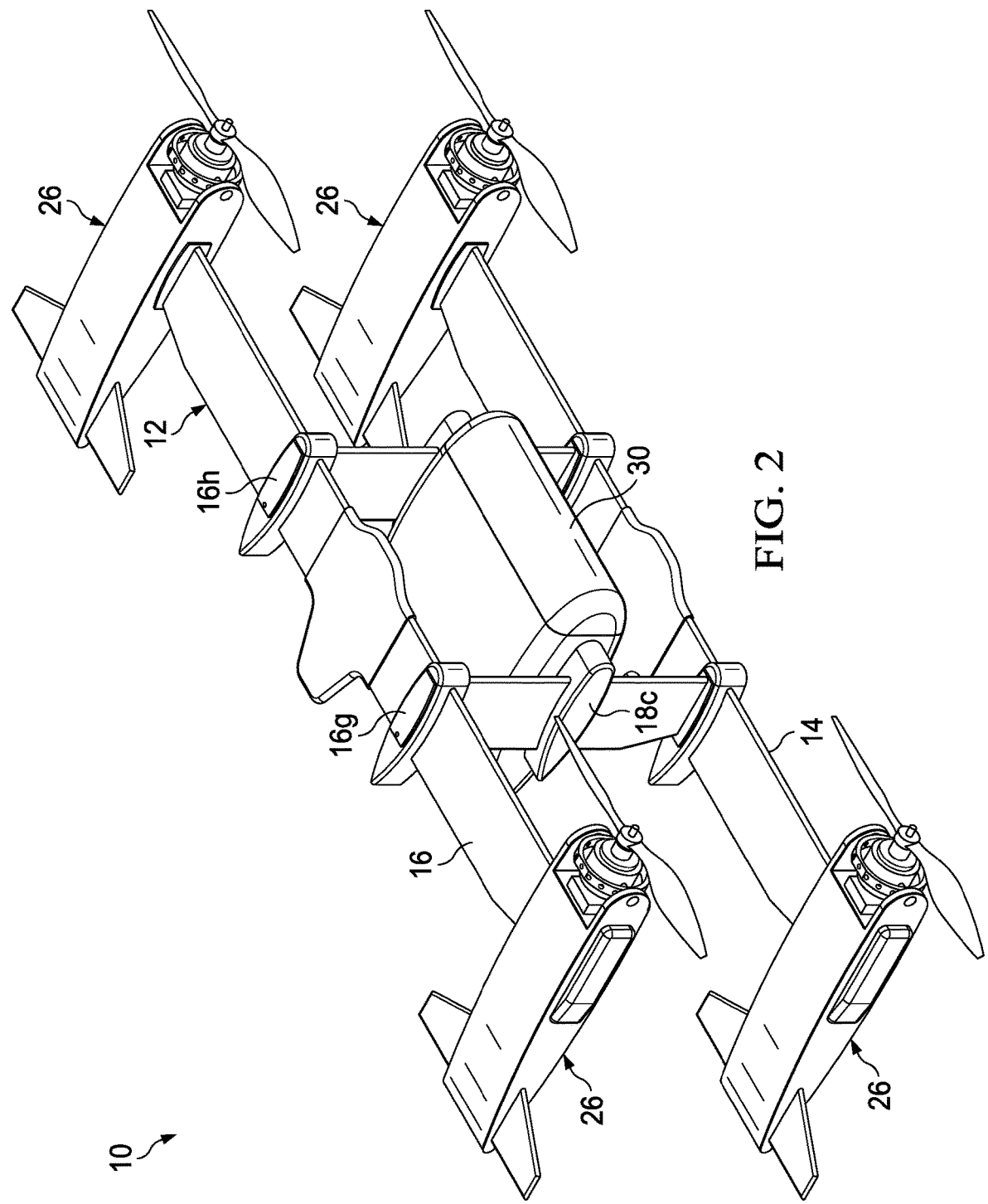
FIG. 2 is an oblique view of the UAV of FIG. 1.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges an aircraft with fuel cell powered line-replaceable thrust modules. The aircraft may include a flight control system and an airframe with at least one anchoring location, referred to as a nacelle station, having a rapid connection interface. The fuel cell powered line-replaceable thrust module includes a nacelle having a rapid connection interface, a fuel cell system disposed within the nacelle, a speed controller coupled to the fuel cell system, and a propulsion system coupled to the speed controller and the fuel cell system. The propulsion system includes an electric motor having an output drive and a rotor assembly having a plurality of rotor blades that are rotatable with the output drive of the electric motor in a rotational plane to generate thrust. The electric motor is operable to rotate responsive to power from the fuel cell system at a speed responsive to the speed controller. Coupling the rapid connection interface of the nacelle to the rapid connection interface of the nacelle station provides structural and electrical connections between the airframe and the nacelle that are operable for rapid replacement of the fuel cell powered line-replaceable thrust module at an operating location. While the aircraft shown and discussed herein is depicted as a UAV, it should be understood that it may comprise any type of aircraft.

In some embodiments, a gimbal may be coupled to and operable to tilt relative to the nacelle. In such embodiments, the propulsion system may be coupled to and operable to tilt with the gimbal such that actuation of the gimbal tilts the propulsion system relative to the nacelle to change the rotational plane of the rotor assembly relative to the nacelle, thereby controlling the direction of a thrust vector. In certain embodiments, the gimbal may tilt about a single axis to provide unidirectional thrust vectoring. In other embodiments, the gimbal may tilt about first and second orthogonal axes to provide omnidirectional thrust vectoring. In some embodiments, one or more aerosurfaces may be coupled to and operable to tilt relative to the nacelle. In certain embodiments, the structural and electrical connections between the airframe and the nacelle may include high speed fastening elements such as cam and hook connections, pin and socket connections, quarter-turn latch connections, snap connections, and/or magnetic connections. In some embodiments, the structural and electrical connections between the airframe and the nacelle may include one or more communication channels, one or more redundant communication channels, and/or one or more triply redundant communication channels. In certain embodiments, the structural and electrical connections between the airframe and the nacelle may include one or more command signal channels, one or more low power current channels, one or more high power current channels, and/or combinations thereof.

Referring to FIGS. 1-3G, various views of a tailsitter UAV 10, operable to transition between thrust-borne lift in a VTOL orientation and wing-borne lift in a biplane orientation, are depicted. FIGS. 1, 3A, 3C, and 3E depict UAV 10 in the VTOL orientation, wherein the thrust modules provide thrust-borne lift. FIGS. 2, 3B, 3D, and 3F depict UAV 10 in the biplane orientation, wherein the thrust modules provide forward thrust and the forward airspeed of UAV 10 provides wing-borne lift, enabling UAV 10 to have a high speed and/or high endurance forward-flight mode.

UAV 10 is a mission-configurable aircraft operable to provide high-efficiency transportation for diverse payloads. Based upon mission parameters, including flight parameters such as environmental conditions, speed, range, and thrust requirements, as well as payload parameters such as size, shape, weight, type, durability, and the like, UAV 10 may selectively incorporate a variety of thrust modules having different characteristics and/or capacities. For example, the thrust modules operable for use with UAV 10 may have difference thrust types including different maximum thrust outputs and/or different thrust vectoring capabilities including non-thrust vectoring thrust modules, single-axis thrust vectoring thrust modules such as longitudinal thrust vectoring thrust modules and/or lateral thrust vectoring thrust modules, and two-axis thrust vectoring thrust modules which may also be referred to as omnidirectional thrust vectoring thrust modules. In addition, various components of each thrust module may be selectable including the power plant configuration and the rotor design. For example, the type or capacity of the fuel cell system in a thrust module may be selected based upon the power, weight, endurance, altitude, and/or temperature requirements of a mission. Likewise, the characteristics of the rotor assemblies may be selected, such as the number of rotor blades, the blade pitch, the blade twist, the rotor diameter, the chord distribution, the blade material, and the like.

In the illustrated embodiment, UAV 10 includes an airframe 12 including wings 14 and 16 each having an airfoil cross-section that generates lift responsive to the forward airspeed of UAV 10 when in the biplane orientation. Wings 14 and 16 may be formed as single members or may be formed from multiple wing sections. The outer skins of wings 14 and 16 are preferably formed from high strength and lightweight materials such as fiberglass, carbon fiber, plastic, aluminum, and/or another suitable material or combination of materials. As illustrated, wings 14 and 16 are straight wings. In other embodiments, wings 14 and 16 could have other designs such as polyhedral wing designs, swept wing designs, or another suitable wing design. As best seen in FIG. 3G, wing 14 has two anchoring locations, referred to as pylon stations 14a and 14b and four nacelle stations 14c, 14d, 14e, and 14f. Likewise, wing 16 has two pylon stations 16a and 16b and four nacelle stations 16c, 16d, 16e, and 16f These stations are anchoring locations which serve to provide the structure required for connecting other components of the aircraft thereto. As such, each of pylon stations 14a, 14b, 16a, and 16b and each of nacelle stations 14c, 14d, 14e, 14f, 16c, 16d, 16e, and 16f includes a rapid connection interface operable for mechanical and electrical connectivity, as discussed herein. Extending generally perpendicularly between wings 14 and 16 are two truss structures depicted as pylons 18 and 20. Pylon 18 is coupled between pylon stations 14a and 16a and preferably forms a mechanical and electrical connection therebetween. Pylon 20 is coupled between pylon stations 14b and 16b and preferably forms a mechanical and electrical connection therebetween. In other embodiments, more than two pylons may be present. Pylons 18 and 20 are preferably formed from high strength and lightweight materials such as fiberglass, carbon fiber, plastic, aluminum, or another suitable material or combination of materials. As best seen in FIG. 3G, pylon 18 has a nacelle station 18a and a payload station 18b. Likewise, pylon 20 has a nacelle station 20a and a payload station 20b. Each of nacelle stations 18a and 20a and each of payload stations 18b and 20b includes a rapid connection interface operable for mechanical and electrical connectivity, as discussed herein. In the configuration illustrated in FIGS. 1 and 2, there are no thrust modules coupled to nacelle stations 14e, 14f, 16e, and 16f, those stations are therefore covered by nacelle station covers 14g, 14h, 16g, and 16h, respectively. Similarly, in the configuration illustrated in FIGS. 3A-3G, as no thrust module is coupled to either of pylons 18 or 20, a nacelle station cover 18c protects nacelle station 18a of pylon 18 and a nacelle station cover 20c protects nacelle station 20a of pylon 20.

Wings 14 and 16 and pylons 18 and 20 preferably include central passageways operable to contain flight control systems, energy sources, communication lines and/or other desired systems. For example, as best seen in FIGS. 3C and 3D, pylon 20 houses a flight control system 22 of UAV 10. Flight control system 22 is preferably a redundant digital flight control system including multiple independent flight control computers. For example, the use of a triply redundant flight control system 22 improves the overall safety and reliability of UAV 10 in the event of a failure in flight control system 22. Flight control system 22 preferably includes non-transitory computer readable storage media including a set of computer instructions executable by one or more processors for controlling the operation of UAV 10. In addition, flight control system 22 may be selectively connectable to other computer systems via a proprietary encrypted network, a public encrypted network, the Internet, or other suitable communication network that may include both wired and wireless connections.

Wings 14 and 16 and pylons 18 and 20 may optionally contain one or more of electrical power sources depicted as one or more batteries 22a in pylon 20, as best seen in FIGS. 3C and 3D. Batteries 22a supply electrical power to flight control system 22. In some embodiments, batteries 22a may be configured to supply emergency backup electrical power for the distributed thrust array of UAV 10. Wings 14 and 16 and pylons 18 and 20 also contain a communication network 25 including the electrical interfaces of pylon stations 14a, 14b, 16a, and 16b, nacelle stations 14c, 14d, 14e, 14f, 16c, 16d, 16e, 16f, 18a, and 20a, and payload stations 18b and 20b that enables flight control system 22 to communicate with the distributed thrust array of UAV 10. In addition to providing for data transmission, communication network 25 also may also enable electrical energy transmission therethrough. In the illustrated embodiment, UAV 10 has a two-dimensional distributed thrust array that is coupled to airframe 12. As used herein, the term "two-dimensional thrust array" refers to a plurality of thrust generating elements that occupy a two-dimensional space in the form of a plane.

The two-dimensional distributed thrust array of UAV 10, as shown in FIGS. 3A-3G, includes a plurality of inboard thrust modules, individually and collectively denoted as 24 and a plurality of outboard thrust modules, individually and collectively denoted as 26. Inboard thrust modules 24 are respectively coupled to nacelle stations 14e and 14f of wing 14 and nacelle stations 16e and 16f of wing 16 and preferably form mechanical and electrical connections therewith. Outboard thrust modules 26 are respectively coupled to nacelle stations 14c and 14d of wing 14 and nacelle stations 16c and 16d of wing 16 and preferably form mechanical and electrical connections therewith.

In the illustrated embodiment, inboard thrust modules 24 and outboard thrust modules 26 have difference thrust types. For example, outboard thrust modules 26, individually and collectively, may have a higher maximum thrust output than inboard thrust modules 24. Alternatively, or additionally, outboard thrust modules 26 may be variable speed thrust modules while inboard thrust modules 24 may be single speed thrust modules. In the illustrated embodiment, inboard thrust modules 24 are fixed pitch, variable speed, non-thrust vectoring thrust modules, while outboard thrust modules 26 are fixed pitch, variable speed, omnidirectional thrust vectoring thrust modules.

As illustrated, outboard thrust modules 26 are coupled to the outboard ends of wings 14 and 16, inboard thrust modules 24 are coupled to central portions of wings 14 and 16. Thrust modules 24 and 26 are independently attachable to and detachable from airframe 12 such that UAV 10 may be part of a man-portable aircraft system having component parts with connection features designed to enable rapid assembly/disassembly of UAV 10. Alternatively, or additionally, the various components of UAV 10 including flight control system 22, wings 14 and 16, pylons 118 and 20, and thrust modules 24 and 26 may be selected by an aircraft configuration computing system based upon mission specific parameters. This may be enabled, in part, by using thrust modules 24 and 26 that are standardized and/or interchangeable line replaceable units providing easy installation and removal from airframe 12. As discussed herein, thrust modules 24 and 26 may be coupled to nacelle stations 14c, 14d, 14e, 14f, 16c, 16d, 16e, and 16f of wings 14 and 16 using rapid connection interfaces to form structural and electrical connections.

For example, the structural connections may include high speed fastening elements such as: cam and hook connections, screws, bolts, pin connections, quarter turn latch connections, snap connections, magnetic connections, and/or electromagnetic connections which may also be remotely releasable connections. The electrical connections may include forming communication channels by connecting the electronics of thrust modules 24 and 26 to the communications network 25. The communications channels may include redundant communication channels, triply redundant communication channels, one or more command signal channels, one or more low power current channels, one or more high power current channels, and/or combinations thereof. In addition, the use of line-replaceable thrust modules 24 and 26 is beneficial in maintenance situations if a fault is discovered with one of the thrust modules 24 and 26. In this case, a faulty thrust module 24 or 26 can be decoupled from airframe 12 by simple operations and another thrust module 24 or 26 can then be attached to airframe 12.

Figure 3A:
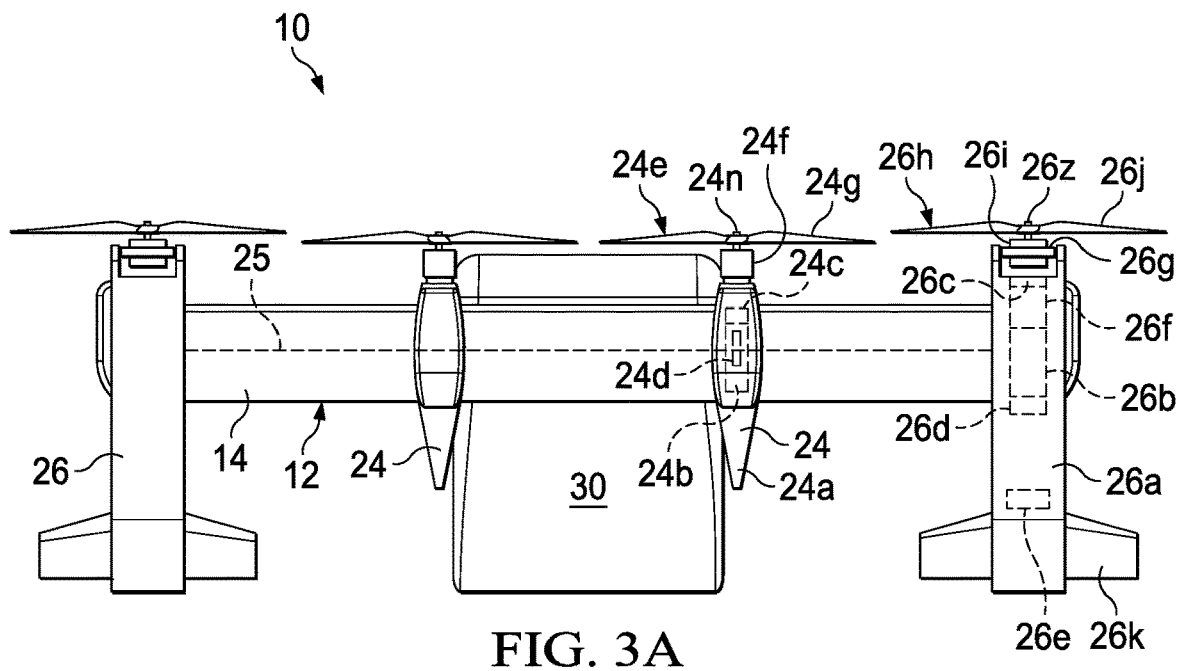
FIGS. 3A-3G are various views of the UAV of FIG. 1, including eight fuel cell powered line-replaceable thrust modules.
Figure 3B:
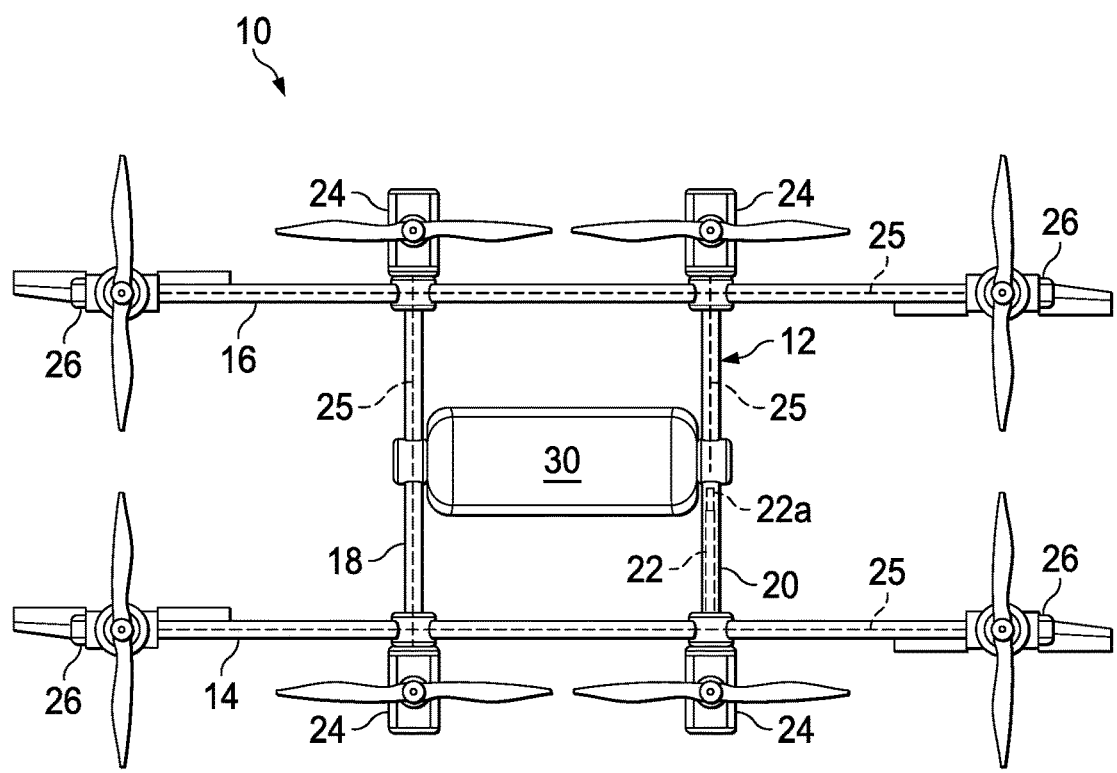
Figure 3C:
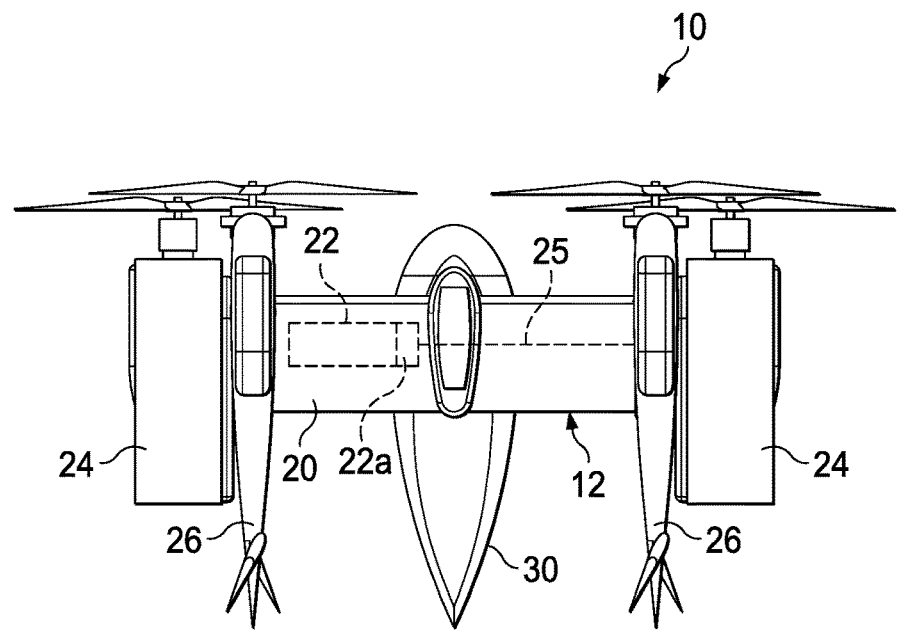
Figure 3D:
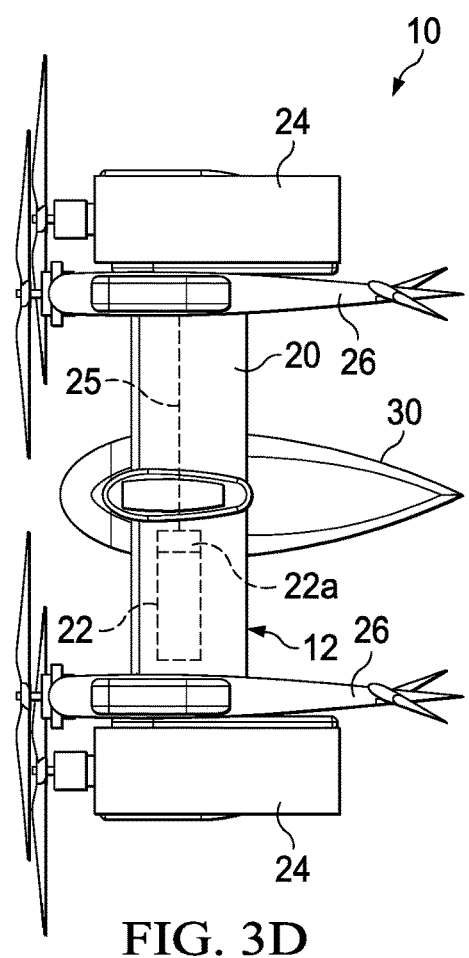
Figure 3E:
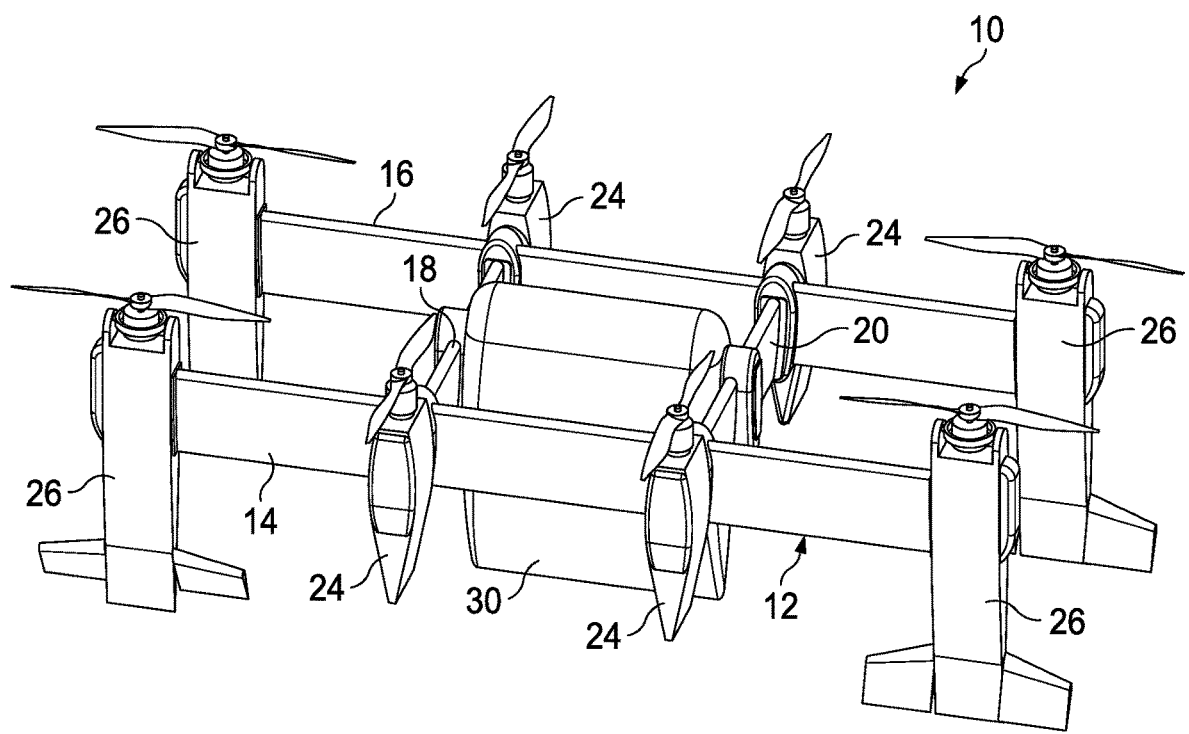
Figure 3F:
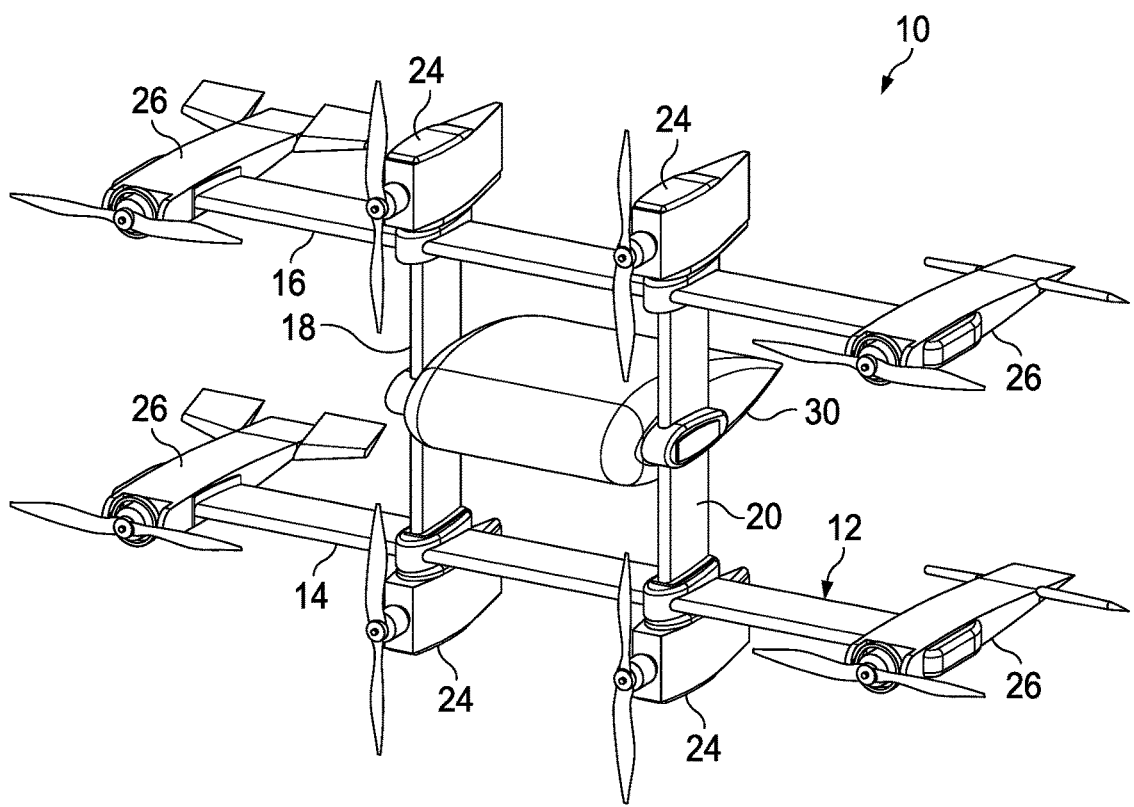
Figure 3G:
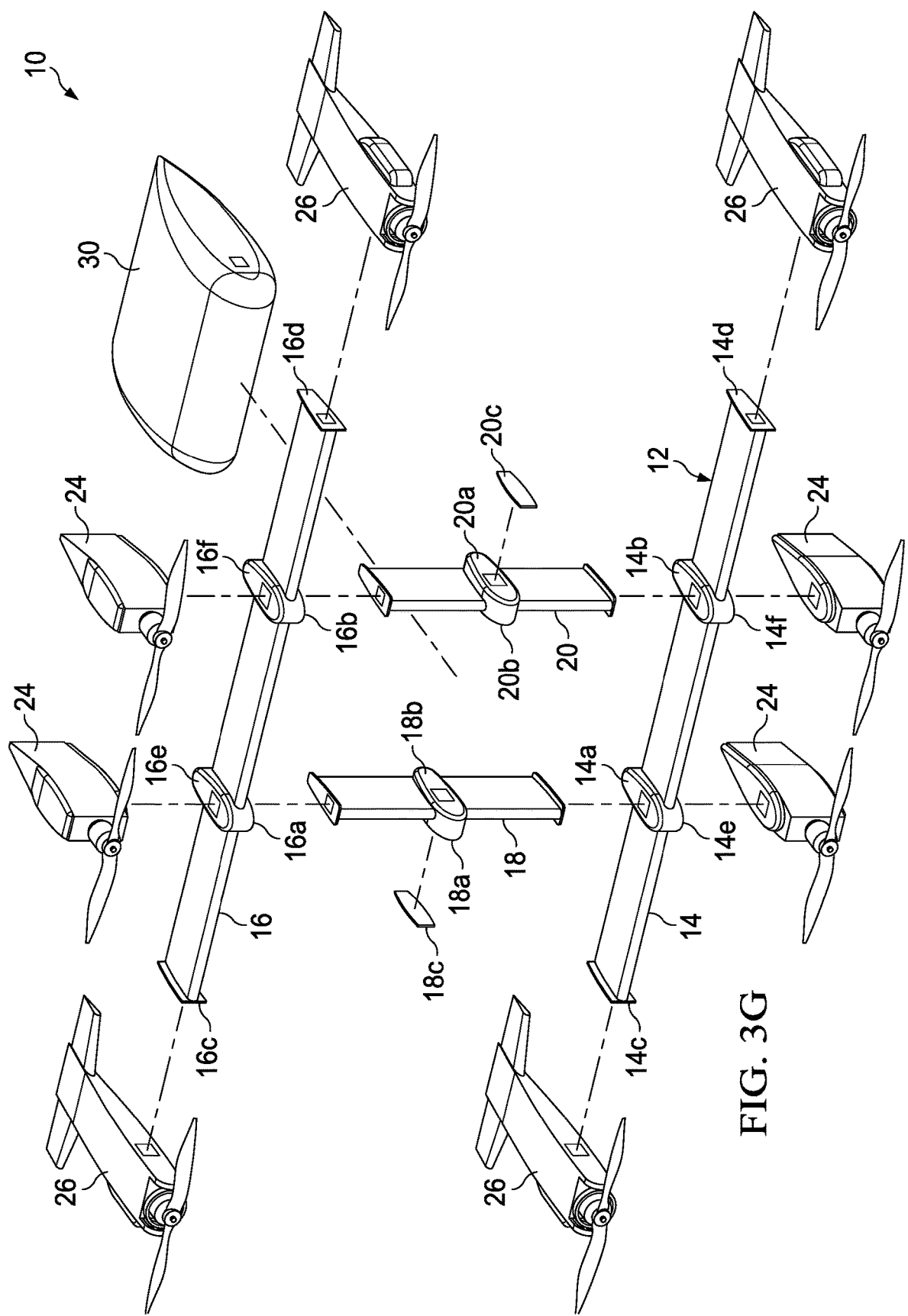

As best seen in FIG. 3A, each inboard thrust module 24 includes a nacelle 24a that houses components including a fuel cell system 24b, an electronic speed controller 24c, an electronics node 24d, sensors, and other desired electronic equipment. Nacelle 24a also supports a propulsion system 24e, depicted as an electric motor 24f and a rotor assembly 24g. As best seen in FIGS. 3A and 4-6, each outboard thrust module 26 includes a nacelle 26a that houses components including a fuel cell system 26b, an electronic speed controller 26c, gimbal actuators 26n and 26p (only shown in FIG. 6), an aerosurface actuator 26e, an electronics node 26f, sensors, and other desired electronic equipment. Nacelle 26a also supports a two-axis gimbal 26g, a propulsion system 26h depicted as an electric motor 26i and a rotor assembly 26j (not shown in FIGS. 4-6), and aerosurfaces 26k. As the power for each thrust module 24 and 26 is provided by fuel cell systems 24b and 26b, housed within respective nacelles 24a and 26a, UAV 10 has a distributed power system for the distributed thrust array. Alternatively, or additionally, electrical power may be supplied to any electric motor 24f or 26i, electronic speed controller 24c or 26c, electronics nodes 24d or 26f, gimbal actuators 26n or 26p, aerosurface actuator 26e, flight control system 22, sensor, and/or other desired equipment from any fuel cell system 24b or 26b via communication network 25. In the illustrated embodiment, aerosurfaces 26k of outboard thrust module 26 are active aerosurfaces that serve as horizontal stabilizers, elevators to control the pitch and/or angle of attack of wings 14 and 16, and/or ailerons to control the roll or bank of UAV 10 in the biplane orientation of UAV 10 and serve to enhance hover stability in the VTOL orientation of UAV 10.

Figure 4:
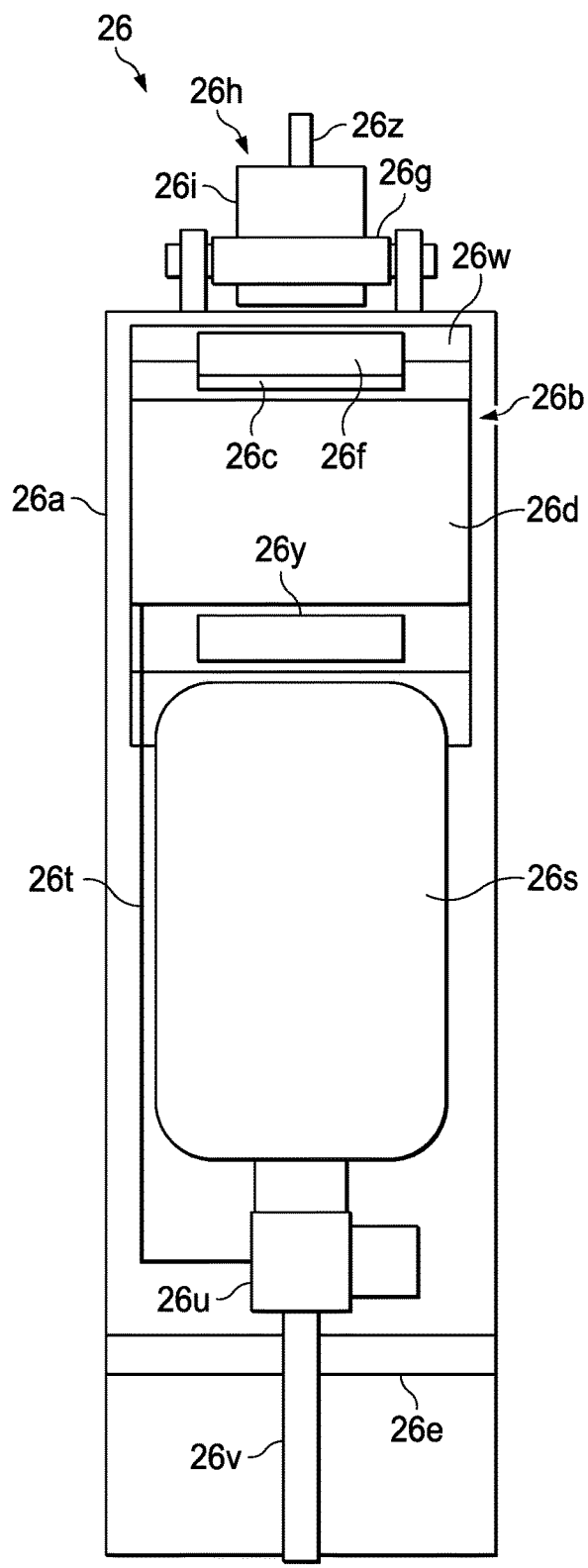
FIG. 4 is a top view of a fuel cell powered line-replaceable thrust module of the UAV of FIG. 1, showing internal components thereof.
Figure 5:
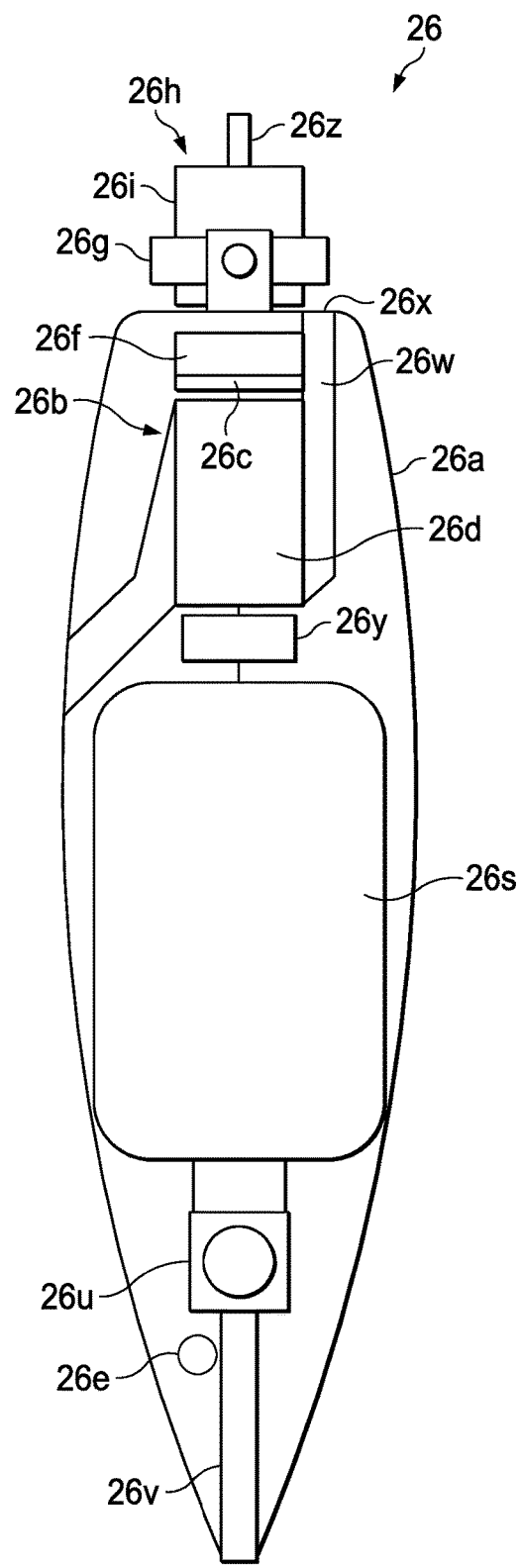
FIG. 5 is a side view of the fuel cell powered line-replaceable thrust module of FIG. 4, showing the internal components thereof.

FIGS. 4 and 5 show fuel cell system 26b disposed within nacelle 26a. Fuel cell system 26b is configured to produce electrical energy from an electrochemical reaction between hydrogen and oxygen. Fuel cell system 26b includes a fuel cell 26d which includes a cathode configured to receive oxygen from the ambient air, an anode configured to receive hydrogen fuel, and an electrolyte between the anode and the cathode that allows positively charged ions to move between the anode and the cathode. While fuel cell 26d is described in the singular, it should be understood that fuel cell 26d may include a fuel cell stack comprising a plurality of fuel cells in series to increase the output thereof. Fuel cell system 26b also includes a hydrogen tank 26s disposed within nacelle 26a. Hydrogen tank 26s may comprise a cylindrical bottle, preferably made of a lightweight material such as carbon fiber or aluminum and may be configured to store liquified or compressed gaseous hydrogen fuel therein. Alternatively, hydrogen tank 26s may comprise any other structure suitable for the storage of hydrogen fuel for use with fuel cell 26d. Hydrogen tank 26s may be fixedly or removably coupled to an interior of nacelle 26a. Hydrogen fuel is delivered to the anode of fuel cell 26d through a supply line 26t coupled to a pressure regulator 26u coupled to hydrogen tank 26s. Pressure regulator 26u is configured to reduce the pressure of the hydrogen fuel from hydrogen tank 26s to a desired pressure in supply line 26t that is suitable for use at the anode of fuel cell 26d. Pressure regulator 26u may also have a filling port 26v coupled thereto. Filling port 26v is configured to enable refilling of hydrogen tank 26s without removing hydrogen tank 26s from nacelle 26a. Filling port 26v may allow for autonomous refilling of hydrogen tank 26s when UAV 10 lands on a landing pad configured for the same. Alternatively, or additionally, nacelle 26a may include an access door configured to provide access to the interior of nacelle 26a, thereby permitting rapid replacement of hydrogen tank 26s with a full hydrogen tank, refilling hydrogen tank 26s in place, and/or removing hydrogen tank 26s for remote refilling.

Oxygen from the ambient air is delivered to the cathode of fuel cell 26d via an air channel 26w. Air channel 26w may serve two functions, supplying oxygen to the cathode and cooling fuel cell 26d. As such, air channel 26w is configured to direct air from outside of nacelle 26a to the cathode of fuel cell 26d and/or to a heat transfer surface of fuel cell 26d. The heat transfer surface of fuel cell 26d may comprise a heat exchanger or any surface configured to enhance heat removal therefrom. Moreover, if fuel cell 26d is an open-cathode air-cooled unit, the airflow delivered to the cathode by air channel 26w may serve as both the cathode reactant supply and cooling air. That is, air ducted to a single location may deliver oxygen to the cathode and cool fuel cell 26d. Air channel 26w includes a forward-facing opening 26x positioned behind rotor assembly 26j such that air is driven through air channel 26w by rotating rotor blades 26r. This is particularly helpful when UAV 10 is operating in the VTOL orientation, as it insures sufficient airflow for oxygen supply and/or cooling purposes. Fuel cell system 26b further includes an electrical energy storage device 26y configured to store and release the electrical energy produced by fuel cell 26d. Electrical energy storage device may comprise a battery, a supercapacitor, or any other device capable of storing and releasing electrical energy. Alternatively, the electrical energy produced by fuel cell 26d may be directly supplied to the electrical components.

Operation of fuel cell system 26b is controlled by electronics node 26f. Electronics node 26f preferably includes non-transitory computer readable storage media including a set of computer instructions executable by one or more processors for controlling the operation of line-replaceable thrust module 26. These operations may include valve and solenoid operations to adjust the flow of hydrogen fuel from supply line 26t to the anode, battery management, directing electrical energy distribution, voltage monitoring of fuel cell 26d, current monitoring for fuel cell 26d and electrical energy storage device 26y, etc.

Figure 6:
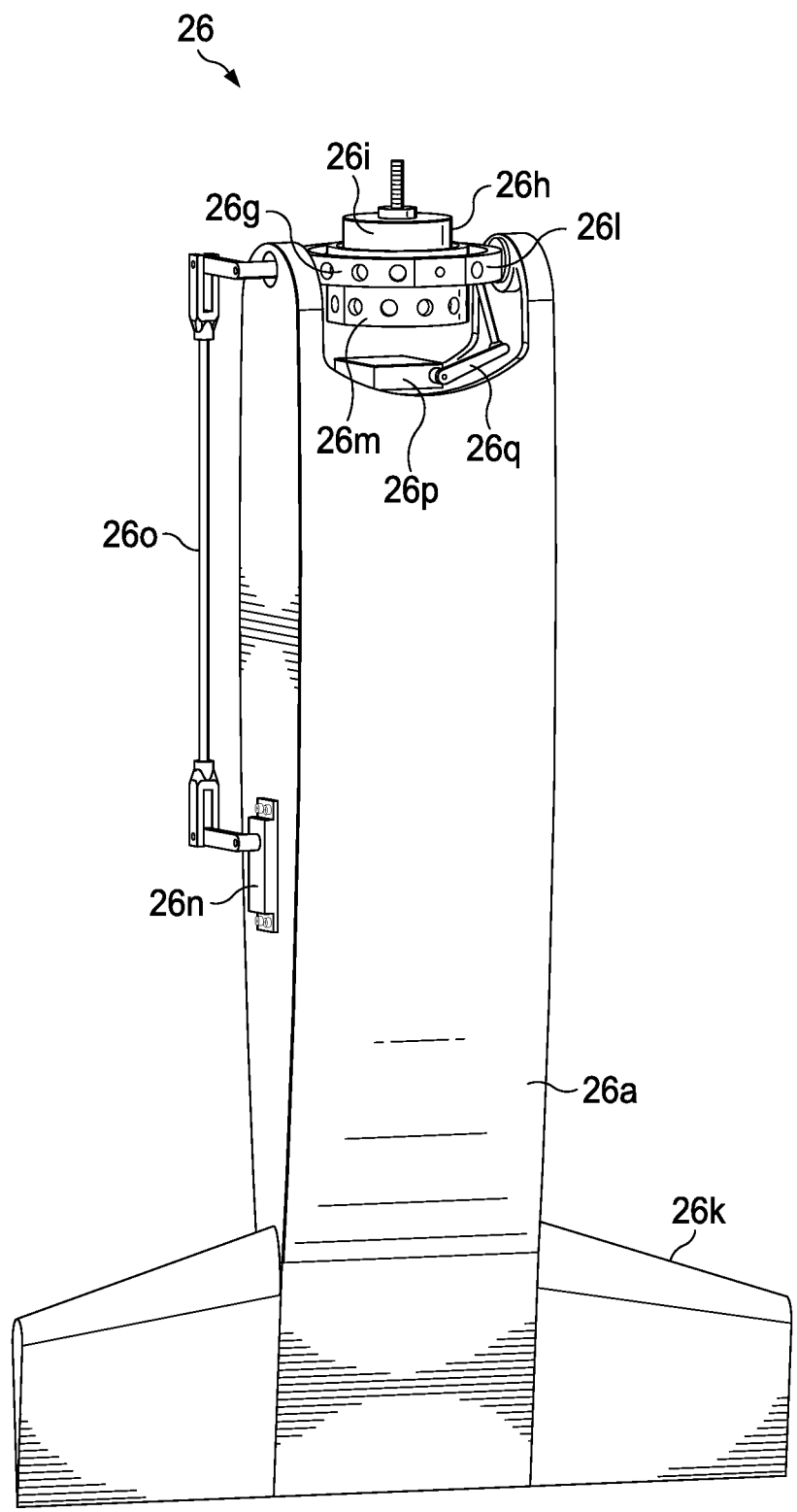
FIG. 6 is an oblique view of the fuel cell powered line-replaceable thrust module of FIG. 4.

FIG. 6 depicts one possible configuration of components for providing omnidirectional thrust vectoring. Thrust module 26 includes nacelle 26a and gimbal 26g that is coupled to nacelle 26a. Gimbal 26g includes an outer gimbal member 26l and an inner gimbal member 26m. Outer gimbal member 26l is pivotally coupled to nacelle 26a and is operable to tilt about a first axis. Inner gimbal member 26m is pivotally coupled to outer gimbal member 26l and is operable to tilt about a second axis that is orthogonal to the first axis. In the illustrated embodiment, actuator 26n is coupled between nacelle 26a and outer gimbal member 26l such that operation of actuator 26n shifts a linkage 26o to tilt outer gimbal member 26l about the first axis relative to nacelle 26a. While actuator 26n and linkage 26o are shown outside nacelle 26a, they could be placed inside nacelle 26a for aerodynamic efficiency. Actuator 26p is coupled between nacelle 26a and inner gimbal member 26m such that operation of actuator 26p shifts a linkage 26q to tilt inner gimbal member 26m about the second axis relative to outer gimbal member 26l and nacelle 26a. Propulsion system 26h is coupled to and is operable to tilt with gimbal 26g about both axes relative to nacelle 26a. In the illustrated embodiment, rotor assembly 26j has been removed from propulsion system 26h such that only electric motor 26i is visible.

Each rotor assembly 24g and 26j (shown in FIGS. 1-3G) is coupled to an output driveshaft 24n and 26z of the respective electric motor 24f and 26i that rotates rotor assemblies 24g and 26j in a rotational plane to generate thrust for UAV 10. In the illustrated embodiment, rotor assembly 24g includes two rotor blades 24m having a fixed pitch, and each rotor assembly 26j includes two rotor blades 26r having a fixed pitch. In other embodiments, the rotor assemblies could have other numbers of rotor blades including rotor assemblies having three or more rotor blades. Alternatively, or additionally, the rotor assemblies could have variable pitch rotor blades with collective and/or cyclic pitch control. Each electric motor 24f is paired with one rotor assembly 24g to form one propulsion system 24e. In the illustrated embodiment, each propulsion system 24e is secured to one nacelle 24a without a tilting degree of freedom such that thrust modules 24 are non-thrust vectoring thrust modules. Each electric motor 26i is paired with one rotor assembly 26j to form one propulsion system 26h. As described herein, each propulsion system 26h has a two-axis tilting degree of freedom relative to nacelle 26a provided by two-axis gimbal 26g such that thrust modules 26 are omnidirectional thrust vectoring thrust modules. In the illustrated embodiment, the maximum angle of the thrust vector may preferably be between about 10 degrees and about 30 degrees, may more preferably be between about 15 degrees and about 25 degrees, and may most preferably be about 20 degrees. Notably, using a 20-degree thrust vector yields a lateral component of thrust that is about 34 percent of total thrust. In other embodiments, the inboard and/or the outboard propulsion systems may have a single-axis tilting degree of freedom in which case, the thrust modules could act as longitudinal and/or lateral thrust vectoring thrust modules.

Given that the tips of rotor blades 24m and 26r extend beyond the edges of nacelles 24a and 26a, respectively, it may be beneficial to store rotor assemblies 24g and 26j, or just rotor blades 24m and 26r, uncoupled from the line-replaceable thrust modules 24 and 26. Moreover, because configurations of rotor assemblies 24g and 26j may be dependent on particular mission parameters, it may be desirable to store multiple different configurations of rotor assemblies 24g and 26j such that they may be readily changed for meet the varying mission parameters. Finally, rotor blades 24m and 26r are exposed and may be damaged. However, unlike the more complex components of thrust modules 24 and 26, rotor blades 24m and 26r and/or rotor assemblies 24g and 26j may be easily removed and replaced at an operating location. Accordingly, rotor blades 24m and 26r and/or rotor assemblies 24g and 26j may be considered lower line-replaceable units and may be stored in larger quantities than thrust modules 24 and 26. To facilitate rapid removal and replacement of damaged rotor assemblies 24g and 26j and/or rotor blades 24m and 26r, it may be desirable for the rotor assemblies 24g and 26j and/or rotor blades 24m and 26r to be configured for toolless coupling and uncoupling with thrust modules 24 and 26.

Flight control system 22 communicates via wired communications network 25 of airframe 12 with electronics nodes 24d and 26f of thrust modules 24 and 26. Flight control system 22 receives sensor data from and sends flight command information to electronics nodes 24d and 26f such that each thrust module 24 and 26 may be individually and independently controlled and operated. For example, flight control system 22 is operable to individually and independently control the speed of each thrust module 24. In addition, flight control system 22 is operable to individually and independently control the speed, the thrust vector, and the position of aerosurfaces 26k of each thrust module 26. Flight control system 22 may autonomously control some or all aspects of flight operation for UAV 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for UAV 10.

UAV 10 may operate as a transport aircraft for a payload 30 that is fixed to, or selectively attachable to and detachable from, airframe 12. In the illustrated embodiment, payload 30 is selectively couplable between payload stations 18b and 20b of pylons 18 and 20, preferably forming a mechanical and electrical connection therebetween. Payload 30 may carry, include, or be integral with a variety of modules such as a package delivery module, an air reconnaissance module, a light detection and ranging module, a camera module, an optical targeting module, a laser module, a sensors module, an air-to-ground weapons module, an air-to-air weapons module, a communications module, and/or a cargo hook module or the like depending upon the mission being perform by UAV 10. The connection between payload stations 18b and 20b and payload 30 may be a fixed connection that secures payload 30 in a single location relative to airframe 12. Alternatively, payload 30 may be allowed to rotate and/or translate relative to airframe 12 during ground and/or flight operations.

Figure 7:
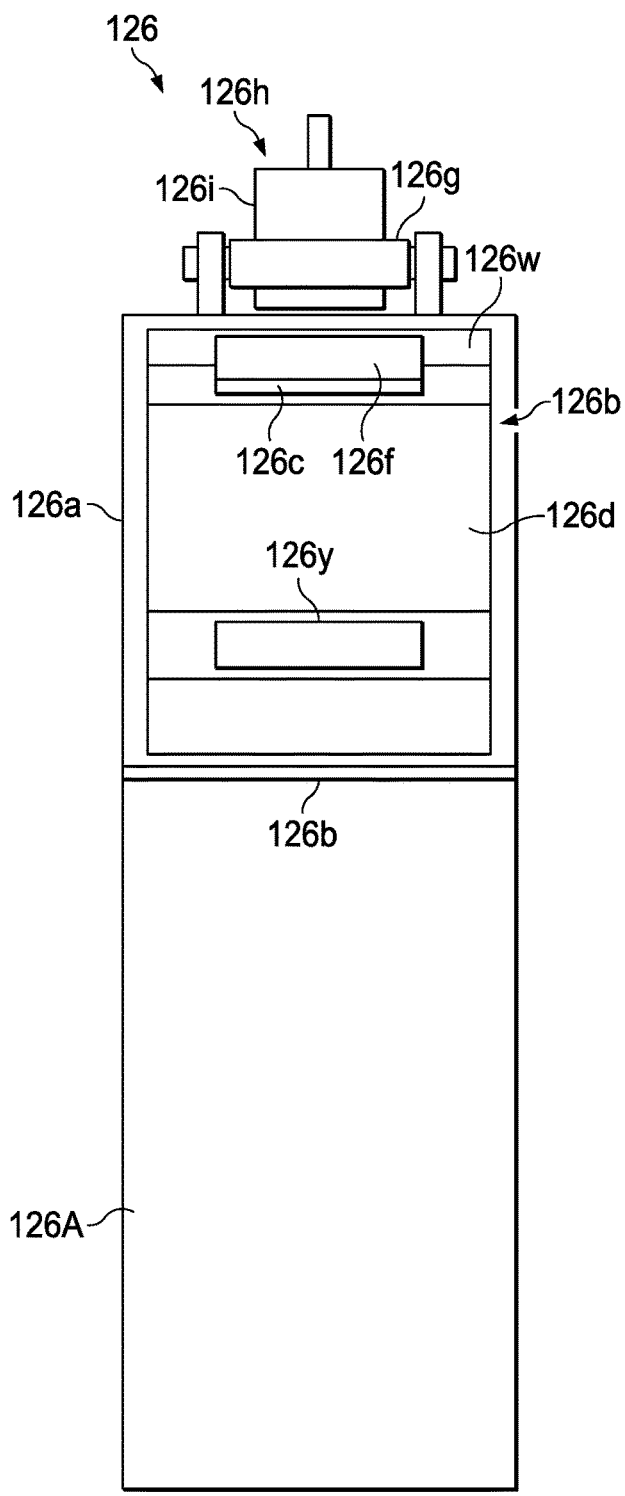
FIG. 7 is a top view of another fuel cell powered line-replaceable thrust module, showing internal components thereof.
Figure 8:
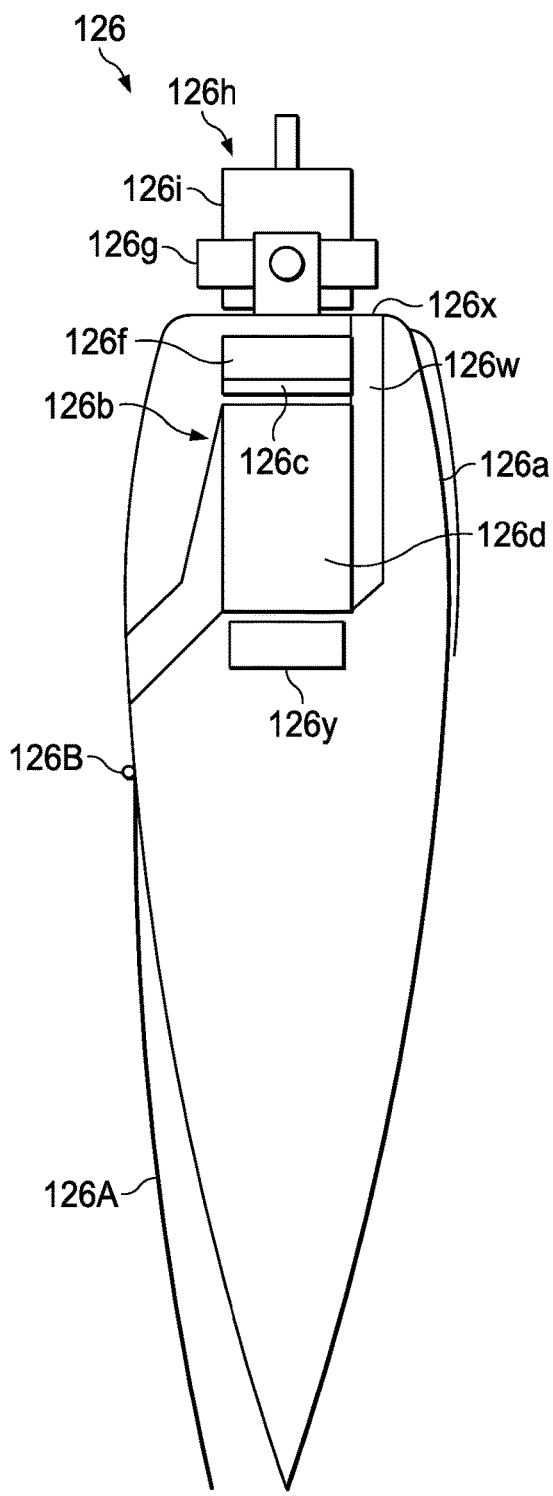
FIG. 8 is a side view of the fuel cell powered line-replaceable thrust module of FIG.

FIGS. 7 and 8 show an alternative line-replaceable thrust module 126 similar to thrust module 26. Thrust module 126 includes a nacelle 126a that houses components including a fuel cell system 126b, an electronic speed controller 126c, gimbal actuators, an electronics node 126f, sensors, and other desired electronic equipment. Nacelle 126a also supports a propulsion system 126h including a two-axis gimbal 126g and an electric motor 126i. Fuel cell system 126b is configured to produce electrical energy from an electrochemical reaction between hydrogen and oxygen. Fuel cell system 126b includes a fuel cell 126d which includes a cathode configured to receive oxygen from the ambient air, an anode configured to receive hydrogen fuel, and an electrolyte between the anode and the cathode that allows positively charged ions to move between the anode and the cathode. While fuel cell 126d is described in the singular, it should be understood that fuel cell 126d may include a fuel cell stack comprising a plurality of fuel cells in series to increase the output thereof. Contrary to line-replaceable thrust module 26, line-replaceable thrust module 126 does not include a hydrogen tank therein. Rather, a remote hydrogen tank may be located elsewhere on UAV 10, for example, within wing 14, wing 16, pylon 18, pylon 20, payload 30, within a different thrust module, or externally mounted to airframe 12. In this configuration, UAV 10 includes a supply line coupled between the remote hydrogen tank and the anode of fuel cell 126d. The supply line may be uninterrupted between the remote hydrogen tank and the anode, which would require a user to manually attached the supply line to the anode when coupling thrust module 126 to UAV 10. Alternatively, thrust module 126 and UAV 10 may include complimentary rapid connection interfaces that include not only electrical and mechanical connections, but also include gaseous connections for automated, or quick-connection, of separate portions of the supply line.

Alternatively, it may desirable for the hydrogen tank to be secured within nacelle 126a, but for various reasons, it may not be desirable to store hydrogen tanks in the same location as replacement thrust modules 126. Instead, hydrogen tanks may be stored separately as lower line-replaceable units available for rapid installation and replacement within nacelle 126a. In order to facilitate the rapid installation and replacement of hydrogen tanks, nacelle 126a includes an access door 126A attached via a hinge 126B that is configured to provide access to the interior of nacelle 126a. The tank may have a pressure regulator and a supply line coupled thereto and nacelle 126a may be configured for the rapid coupling of the supply line to the anode of fuel cell 126d.

Oxygen from the ambient air is delivered to the cathode of fuel cell 126d via an air channel 126w. Air channel 126w may serve two functions, supplying oxygen to the cathode and cooling fuel cell 126d. As such, air channel 126w is configured to direct air from outside of nacelle 126a to the cathode of fuel cell 126d and/or to a heat transfer surface of fuel cell 126d. The heat transfer surface of fuel cell 126d may comprise a heat exchanger or any surface configured to enhance heat removal. Air channel 126w includes a forward-facing opening 126x positioned behind a rotor assembly such that air is driven through air channel 126w by rotating rotor blades. This is particularly helpful when UAV 10 is operating in the VTOL orientation, as it insures sufficient airflow for oxygen supply and/or cooling purposes. Fuel cell system 126b further includes an electrical energy storage device 126y configured to store and release the electrical energy produced by fuel cell 126d. Electrical energy storage device may comprise a battery, a supercapacitor, or any other device capable of storing and releasing electrical energy. Alternatively, the electrical energy produced by fuel cell 126d may be directly supplied to the electrical components.

Operation of fuel cell system 126b is controlled by electronics node 126f Electronics node 126f preferably includes non-transitory computer readable storage media including a set of computer instructions executable by one or more processors for controlling the operation of line-re-placeable thrust module 126. These operations may include valve and solenoid operations to adjust the flow of hydrogen fuel from the supply line to the anode, battery management, directing electrical energy distribution, voltage monitoring of fuel cell 126d, current monitoring for fuel cell 126d and electrical energy storage device 126y, etc.

As forward flight in the biplane orientation utilizing wing-borne lift requires significantly less power than VTOL flight utilizing thrust-borne lift, the operating speed of some or all of thrust modules 24 and 26 may be reduced. In certain embodiments, some of the thrust modules 24 and 26 of UAV 10 could be shut down during forward flight.

While UAV 10 may be reconfigured with different numbers or types of thrust modules to satisfy different flight requirements, UAV 10 may also be configured to allow fuel cell systems 24b, 26b, and/or 126b to switch between operating on oxygen from ambient air and operating on oxygen provided by an on board oxygen tank such as the system disclosed in U.S. patent application Ser. No. 16/214,735, filed on Dec. 10, 2018, which is incorporated herein by reference in its entirety. Operating a fuel cell on oxygen, rather than air, can increase the power produced by the fuel cell, at sea level, by 15 to 20 percent. As such, the increased power of the oxygen mode may be used in the VTOL orientation and air mode may be used in the biplane orientation. It may be desirable for UAV 10 to have an oxygen tank that is remote from the thrust modules. Accordingly, a remote oxygen tank may be located anywhere on UAV 10, for example, within wing 14, wing 16, pylon 18, pylon 20, payload 30, within a different thrust module, or externally mounted to airframe 12. In this configuration, UAV 10 includes a supply line coupled between the remote oxygen tank and the cathode of fuel cell 126d. The supply line may be uninterrupted between the remote oxygen tank and the cathode, which would require a user to manually attached the supply line to the cathode when coupling thrust module to UAV 10. Alternatively, the thrust module and UAV 10 may include complimentary rapid connection interfaces that include not only electrical and mechanical connections, but also include gaseous connections for automated, or quick-connection, of separate portions of the supply line.

Figure 9A:
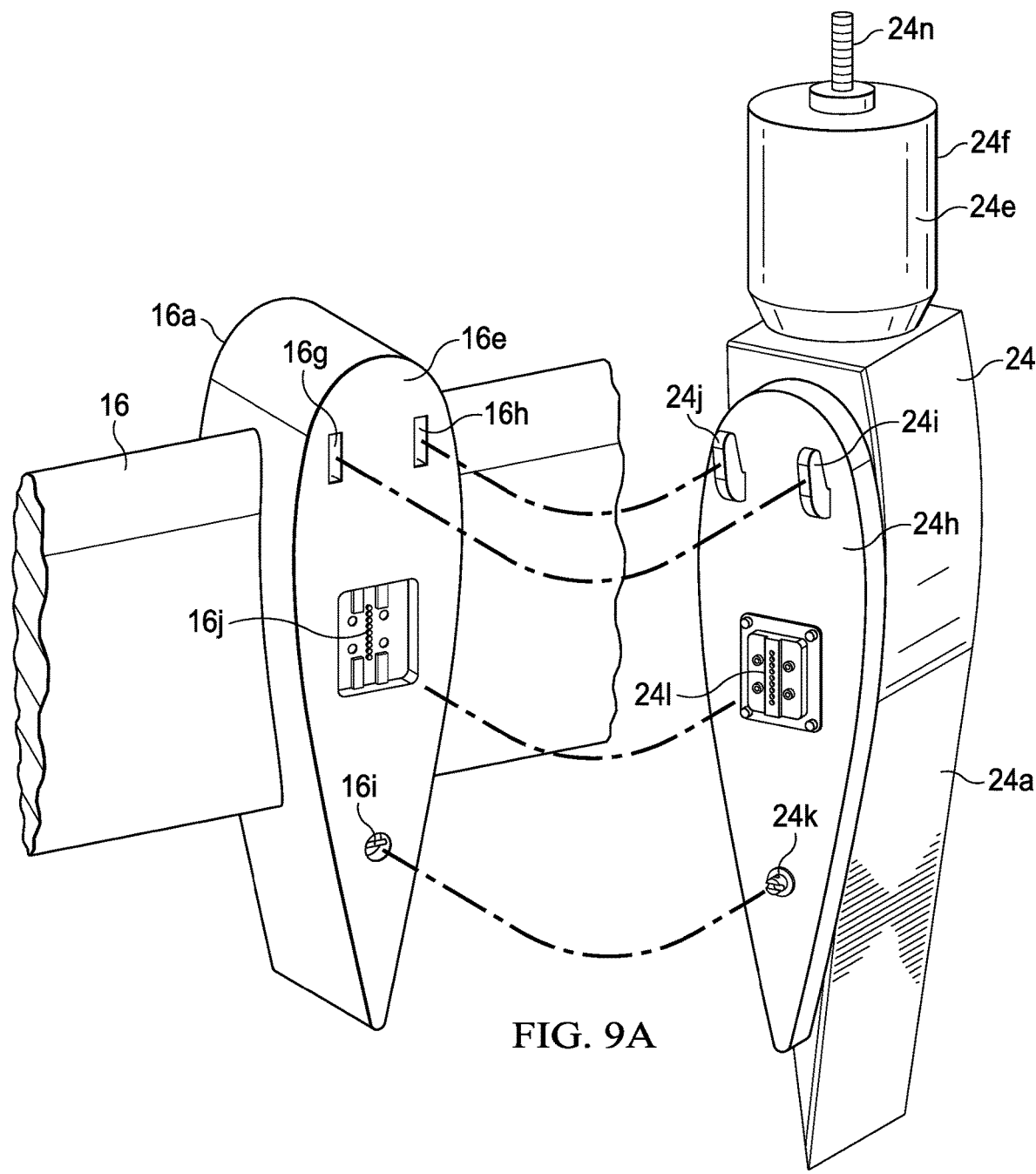
FIGS. 9A-9C are various views of a connecting structure for attaching a fuel cell powered line-replaceable thrust module to a UAV.
Figure 9B:
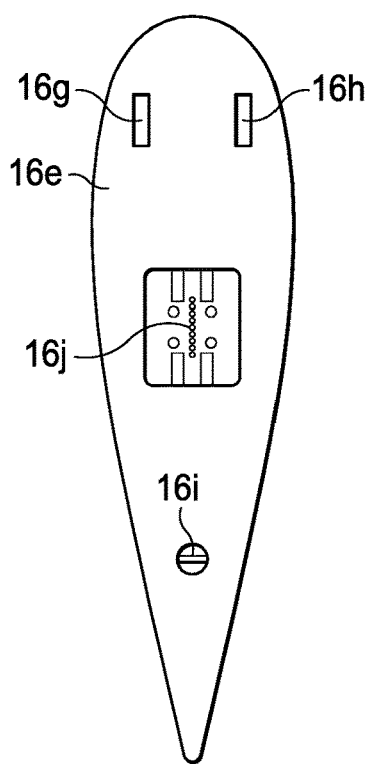
Figure 9C:
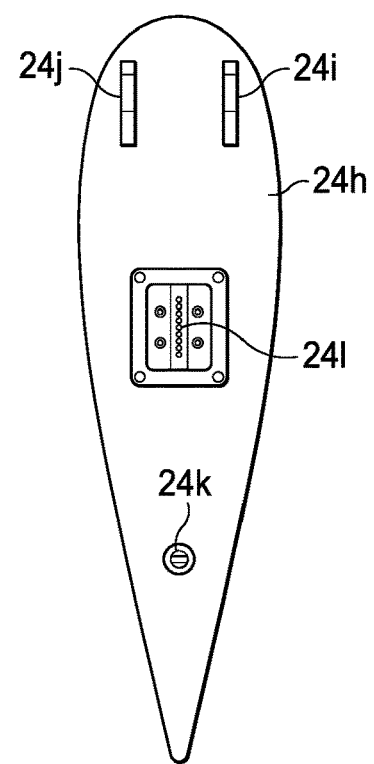

The connections between wings 14 and 16, pylons 18 and 20, thrust modules 24, 26, and 126, and payload 30 of UAV 10 are each operable for rapid on-site assembly through the use of high-speed fastening elements. For example, referring to FIGS. 9A-9C, the structural and electrical connections between nacelle station 16e of wing 16 and thrust module 24 will now be described. Nacelle station 16e has a rapid connection interface that includes a pair of upper mechanical connections depicted as cams 16g and 16h, the outer slot portion of each being visible in the drawings. Nacelle station 16e includes a lower mechanical connection depicted as spring 16i. Disposed between cams 16g and 16h and spring 16i is a central mechanical connection including an electrical connection depicted as a female mating profile with a plurality of electrical pins 16j, such as spring biased pins. In the illustrated embodiment, thrust module 24 includes a rapid connection interface 24h having a pair of upper mechanical connections depicted as hooks 24i and 24j and a lower mechanical connection depicted as a slotted fastener 24k. Disposed between hooks 24i and 24j and slotted fastener 24k is a central mechanical connection including an electrical connection depicted as a male mating profile with a plurality of electrical sockets 24l.

In operation, nacelle station 16e and thrust module 24 may be coupled and decoupled with simple operations. Specifically, to couple thrust module 24 with nacelle station 16e, the distal ends of hooks 24i and 24j are inserted into the outer slots of cams 16g and 16h with thrust module 24 tilted relative to nacelle station 16e at an angle between about 30 degrees and about 60 degrees. Once hooks 24i and 24j are inserted into cams 16g and 16h, thrust module 24 is rotated relative to nacelle station 16e about cams 16g and 16h to reduce the angle therebetween, such that hooks 24i and 24j further penetrate into nacelle station 16e providing a self-location operation for the other mechanical and electrical connections. Specifically, as the angle between thrust module 24 and nacelle station 16e is reduced, the male mating profile enters the female mating profile and pins 16j sequentially enter sockets 24l forming a multi-channel parallel interface. Depending upon the number of pin and sockets, as well as the desired communication protocol being established therebetween, this electrical connection may provide single communication channels, redundant communication channels, or triply redundant communication channels for the transfer of control commands, low power current, high power current, and/or other signals between thrust module 24 and nacelle station 16e to enable, for example, communication between flight control system 22 and components within thrust module 24 such as fuel cell system 24b, electronic speed controller 24c, electronics node 24d, sensors, and/or other electronic equipment, as discussed herein.

As the angle between thrust module 24 and nacelle station 16e is further reduced, a lower mechanical connection between thrust module 24 and nacelle station 16e is established with slotted fastener 24k and spring 16i. Once spring 16i enters the channel of slotted fastener 24k, a simple manual or automated quarter turn rotation of slotted fastener 24k securely completes the mechanical and electrical connection of thrust module 24 with nacelle station 16e. In a similar manner, the various connections may be made between pylons 18 and 20 and pylon stations 14a, 14b, 16a, and 16b, thrust modules 26 and nacelle stations 14c, 14d, 16c, and 16d, payload 30 and payload stations 18b and 20b, as well as the other thrust modules 24 and nacelle stations 14e, 14f, 16f, 18a, and 20a, in accordance with the desired configuration of UAV 10.

Disassembly of UAV 10 is achieved by reversing the assembly process. Referring again to FIGS. 9A-9C, from the assembled state, a quarter turn rotation of slotted fastener 24k enables separation of slotted fastener 24k from spring 16i. Thereafter, thrust module 24 is rotated relative to nacelle station 16e about cams 16g and 16h to increase the angle therebetween. As the angle between thrust module 24 and nacelle station 16e is increased, the electrical connection between thrust module 24 and nacelle station 16e is released as pins 16j sequentially separate from sockets 24l and the male mating profile separates from the female mating profile. As the angle between thrust module 24 and nacelle station 16e is further increased, hooks 24i and 24j are released from cams 16g and 16h completing the mechanical and electrical decoupling of thrust module 24 from nacelle station 16e. In a similar manner, the connections between pylons 18 and 20 and pylon stations 14a, 14b, 16a, and 16b, thrust modules 26 and nacelle stations 14c, 14d, 16c, and 16d, payload 30 and payload stations 18b and 20b, as well as the other thrust modules 24 and nacelle stations 14e, 14f, 16f, 18a, and 20a may be decoupled.

Figure 10A:
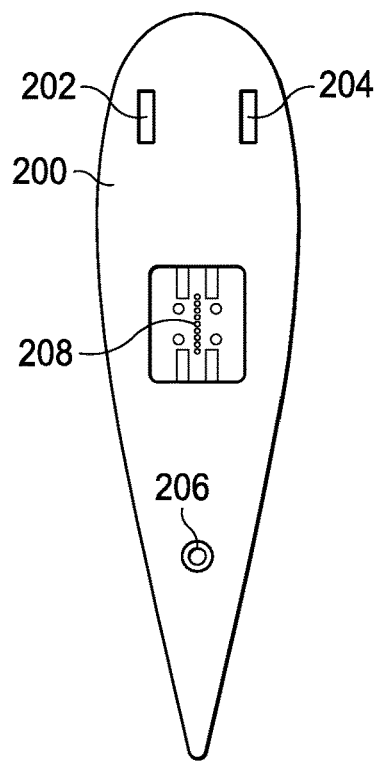
FIGS. 10A and 10B are front views of another connecting structure for attaching a fuel cell powered line-replaceable thrust module to a UAV.
Figure 10B:
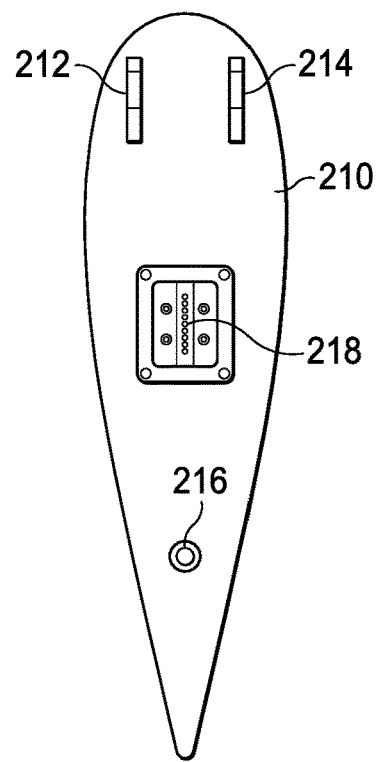

Referring to FIGS. 10A and 10B, an alternate embodiment of the structural and electrical connections between components of UAV 10 will now be described. In the illustrated embodiment, a rapid connection interface 200 includes a pair of upper mechanical connections depicted as cams 202 and 204 and a lower mechanical connection depicted as a female snap element 206. Disposed between cams 202 and 204 and female snap element 206 is a central mechanical connection including an electrical connection depicted as a female mating profile and a plurality of pins 208. Rapid connection interface 200 may represent the connection interface of a nacelle station, a pylon station, and/or a payload station. In the illustrated embodiment, a rapid connection interface 210 includes a pair of upper mechanical connections depicted as hooks 212 and 214 and a lower mechanical connection depicted as a male snap element 216. Disposed between hooks 212 and 214 and male snap element 216 is a central mechanical connection including an electrical connection depicted as a male mating profile and a plurality of sockets 218. Rapid connection interface 210 may represent the connection interface of a thrust module, a pylon, and/or a payload. The act of coupling of rapid connection interface 200 with rapid connection interface 210 is substantially similarly to the connection of nacelle station 16e with rapid connection interface 24h, described above, with the exception that instead of using a quarter turn operation to securely complete the mechanical and electrical connection, a snapping operation is used to securely complete the mechanical and electrical connection. Likewise, the disassembly of rapid connection interface 200 from rapid connection interface 210 is substantially similarly to the disassembly of nacelle station 16e and rapid connection interface 24h, described above, with the exception that instead of using a quarter turn operation to release the lower mechanical connection, an unsnapping operation is used to release the lower mechanical connection.

Figure 11A:
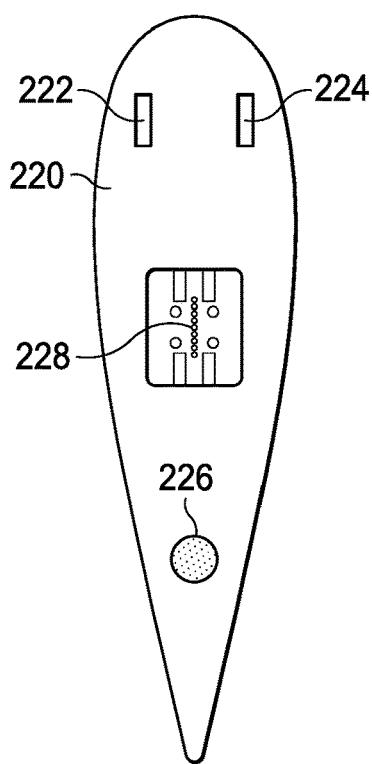
FIGS. 11A and 11B are front views of another connecting structure for attaching a fuel cell powered line-replaceable thrust module to a UAV.
Figure 11B:
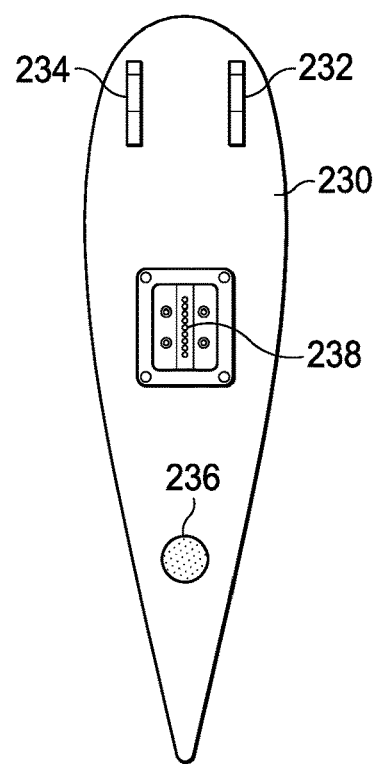

Referring to FIGS. 11A and 11B, another alternate embodiment of the structural and electrical connections between components of UAV 10 will now be described. In the illustrated embodiment, a rapid connection interface 220 includes a pair of upper mechanical connections depicted as cams 222 and 224 and a lower connection depicted as a magnetic element 226, such as a permanent magnet, a switchable magnet, or an electromagnet. Disposed between cams 222 and 224 and magnetic element 226 is a central mechanical connection including an electrical connection depicted as a female mating profile and a plurality of pins 228. Rapid connection interface 220 may represent the connection interface of a nacelle station, a pylon station, and/or a payload station. In the illustrated embodiment, a rapid connection interface 230 includes a pair of upper mechanical connections depicted as hooks 232 and 234 and a lower connection depicted as a magnetic element 236, such as a permanent magnet, a switchable magnet, or an electromagnet. Disposed between hooks 232 and 234 and magnetic element 236 is a central mechanical connection including an electrical connection depicted as a male mating profile and a plurality of sockets 238. Rapid connection interface 230 may represent the connection interface of a thrust module, a pylon, and/or a payload. The connection of rapid connection interface 220 with rapid connection interface 230 is substantially similarly to the connection of nacelle station 16e with rapid connection interface 24h, described above, with the exception that instead of using a quarter turn operation to securely complete the mechanical and electrical connection, magnetic attraction is used to securely complete the mechanical and electrical connection by, for example, establishing an electrical current to energize an electromagnet. Likewise, the disassembly of rapid connection interface 220 with rapid connection interface 230 is substantially similarly to the disassembly of nacelle station 16e from rapid connection interface 24h, described above, with the exception that instead of using a quarter turn operation to release the lower mechanical connection, a mechanical force or discontinuing the electrical current is used to release the lower connection.

Figure 12A:
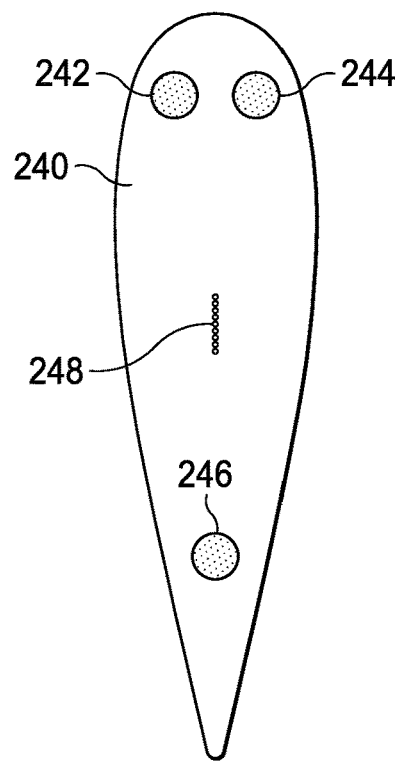
FIGS. 12A and 12B are front views of another connecting structure for attaching a fuel cell powered line-replaceable thrust module to a UAV.
Figure 12B:
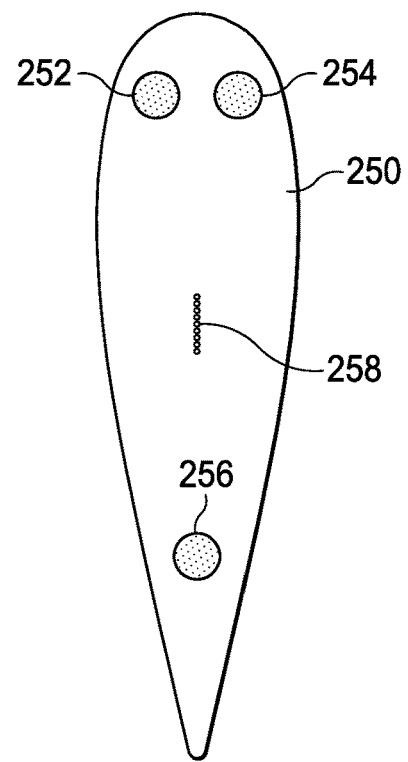

Referring to FIGS. 12A and 12B, a further alternate embodiment of the structural and electrical connections between components of UAV 10 will now be described. This embodiment is particularly useful for payload coupling when remote release capabilities are desired. In the illustrated embodiment, a rapid connection interface 240 includes a pair of upper connections depicted as electromagnets 242 and 244 and a lower connection depicted as an electromagnet 246. Disposed between electromagnets 242 and 244 and electromagnet 246 is an electrical connection depicted as a plurality of pins 248. Rapid connection interface 240 may represent the connection interface of a payload station. In the illustrated embodiment, a rapid connection interface 250 includes a pair of upper connections depicted as magnets 252 and 254 and a lower connection depicted as a magnet 256. Disposed between magnets 252 and 254 and magnet 256 is an electrical connection depicted as a plurality of sockets 258. Rapid connection interface 250 may represent the connection interface of a payload. The coupling of rapid connection interface 240 with rapid connection interface 250 is achieved by aligning electromagnets 242 and 244, electromagnet 246, and pins 248 with magnets 252 and 254, magnet 256, and sockets 258 then engaging a current to create the desired magnetic attraction. In the case of the remotely releasable payload embodiment, when UAV 10 has transported payload 30 to a desired location, flight control system 22, either autonomously or responsive to commands received from a remote source, may disengage the current to electromagnets 242, 244, and 246 which ends the magnetic attraction to magnets 252, 254, and 256, thus releasing payload 30 from airframe 12 either during flight or after landing UAV 10.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A line-replaceable thrust module, comprising:
   a nacelle configured for mechanical connection to an unmanned aerial vehicle (UAV), the nacelle comprising an upstream end and a downstream end;
   an electric motor coupled to the nacelle, wherein the electric motor is configured to convert electrical energy into rotational energy imparted to a shaft extending therefrom;
   an electronic speed controller configured to control the speed of the electric motor, wherein the electronic speed controller is configured for electrical connection to a communication network of the UAV; and
   a fuel cell system disposed at least partially within the nacelle, wherein the fuel cell system is configured to produce electrical energy from an electrochemical reaction between hydrogen and oxygen, the fuel cell system comprising:
      a fuel cell including a cathode, an anode, and an electrolyte therebetween;
      a hydrogen tank comprising an upstream end and a downstream end wherein the upstream end is relatively closer to the fuel cell as compared to the downstream end, wherein the hydrogen tank is disposed within the nacelle, and wherein the hydrogen tank is configured to store hydrogen fuel;
      a pressure regulator coupled to the hydrogen tank; and
      a supply line coupled to the pressure regulator and configured to deliver hydrogen fuel from the hydrogen tank to the anode of the fuel cell; and
      an air channel configured to direct air from outside of the nacelle to the cathode of the fuel cell, the air channel comprising an inlet and an outlet, wherein the outlet is located relatively closer to the upstream end of the nacelle as compared to the downstream end of the hydrogen tank.

2. The line-replaceable thrust module of claim 1, wherein the fuel cell system further comprises a battery or a supercapacitor.

3. The line-replaceable thrust module of claim 2, further comprising:
   a connection interface configured to cooperatively engage a corresponding connection interface on the UAV, wherein the cooperative engagement therebetween creates the mechanical connection between the nacelle and the UAV and the electrical connection between the electronic speed controller and the communication network of the UAV.

4. The line-replaceable thrust module of claim 3, wherein the connection interface is configured to engage with any one of four corresponding connection interfaces of the UAV.

5. The line-replaceable thrust module of claim 4, wherein the electrical connection is configured to allow the fuel cell system to transmit the electrical energy produced by the fuel cell to the UAV.

6. The line-replaceable thrust module of claim 1, further comprising:
   a filling port configured to enable refilling of the hydrogen tank with hydrogen fuel without removing the hydrogen tank from the nacelle.

7. A line-replaceable thrust module, comprising:
   a nacelle removably coupled to an unmanned aerial vehicle (UAV);
   a propulsion system, comprising:
      an electric motor coupled to the nacelle, wherein the electric motor is configured to convert electrical energy into rotational energy imparted to a shaft extending therefrom;
      an electronic speed controller configured to control the speed of the electric motor; and
      a rotor assembly coupled to the shaft of the electric motor, the rotor assembly including a plurality of rotor blades extending therefrom; and
   a fuel cell system disposed at least partially within the nacelle, wherein the fuel cell system is configured to produce electrical energy from an electrochemical reaction between hydrogen and oxygen, the fuel cell system comprising:
      a fuel cell including a cathode, an anode, and an electrolyte therebetween;
      a supply line coupled to the anode of the fuel cell; and
      an electrical energy storage device configured to store and release the electrical energy produced by the fuel cell; and
   an air channel comprising an upstream inlet and a downstream outlet, wherein at least a portion of the downstream outlet is located downstream relative to a most downstream portion of the fuel cell.

8. The line-replaceable thrust module of claim 7, wherein the nacelle includes an access door configured to provide access to an interior of the nacelle, and wherein the interior of the nacelle is configured to removably couple a hydrogen tank therein.

9. The line-replaceable thrust module of claim 7, wherein the propulsion system further comprises a gimbal coupled between the nacelle and the electric motor, wherein the gimbal is configured to rotate the electric motor relative to the nacelle.

10. The line-replaceable thrust module of claim 7, wherein the line-replaceable thrust module is utilized in any one of four locations on the UAV.

11. The line-replaceable thrust module of claim 7, wherein the line-replacement thrust module is configured such that coupling the nacelle to the UAV creates an electrical connection enabling data transmission and/or power transmission between the line-replaceable thrust module and the UAV.

12. The line-replaceable thrust module of claim 7, further comprising:
   an aerosurface rotatably coupled to the nacelle.

13. The line-replaceable thrust module of claim 7, further comprising:
   a sensor configured to transmit data to a flight control system on the UAV.

14. An unmanned aerial vehicle (UAV), comprising:
   a first wing having a connection interface;
   a flight control system;
   a communication network coupled between the flight control system and the connection interface of the first wing; and a first line-replaceable thrust module, comprising:
  a nacelle having a corresponding connection interface removably coupled to the connection interface of the first wing;
  an electric motor coupled to the nacelle, wherein the electric motor is configured to convert electrical energy into rotational energy imparted to a shaft extending therefrom;
  an electronic speed controller configured to control the speed of the electric motor; and
  a fuel cell system disposed at least partially within the nacelle, wherein the fuel cell system is configured to produce electrical energy from an electrochemical reaction between hydrogen and oxygen, the fuel cell system comprising:
    a fuel cell including a cathode, an anode, and an electrolyte therebetween; and
    an electrical energy storage device configured to store and release the electrical energy produced by the fuel cell; and
  an air channel comprising an upstream inlet and a downstream outlet, at least a portion of the downstream outlet being located further downstream than a most downstream portion of the fuel cell system.

15. The UAV of claim 14, wherein the first line-replaceable thrust module further comprises:
  a rotor assembly coupled to the shaft of the electric motor, the rotor assembly including a plurality of rotor blades extending therefrom; and
  a gimbal coupled between the nacelle and the electric motor, wherein the gimbal is configured to rotate the electric motor relative to the nacelle.

16. The UAV of claim 15, wherein:
  air channel is configured to direct air driven by the plurality of rotor blades to the cathode of the fuel cell.

17. The UAV of claim 16, wherein the first line-replaceable thrust module further comprises:
  a hydrogen tank disposed within the nacelle, wherein the hydrogen tank is configured to store hydrogen fuel therein;
  a pressure regulator coupled to the hydrogen tank;
  a supply line coupled between the pressure regulator and the anode of the fuel cell; and
  a filling port coupled to the pressure regulator, wherein the filling port is configured to permit refilling the hydrogen tank without removing the hydrogen tank from the nacelle.

18. The UAV of claim 17, wherein the first line-replaceable thrust module is removably coupled to the first wing proximate a first end thereof, and the UAV further comprises:
  a second wing;
  a second line-replaceable thrust module removably coupled to the first wing proximate a second end thereof;
  a third line-replaceable thrust module removably coupled to the second wing proximate a first end thereof; and
  a fourth line-replaceable thrust module removably coupled to the second wing proximate a second end thereof;
  wherein the first, second, third, and fourth line-replaceable thrust modules are interchangeable.

* * * * *